March 21, 1939. I. A. WEAVER 2,151,063
AUTOMOBILE BODY REPAIRING APPLIANCE
Filed Aug. 30, 1937 2 Sheets-Sheet 1

Inventor:-
Ira A. Weaver,
By Walter M. Fuller Atty.

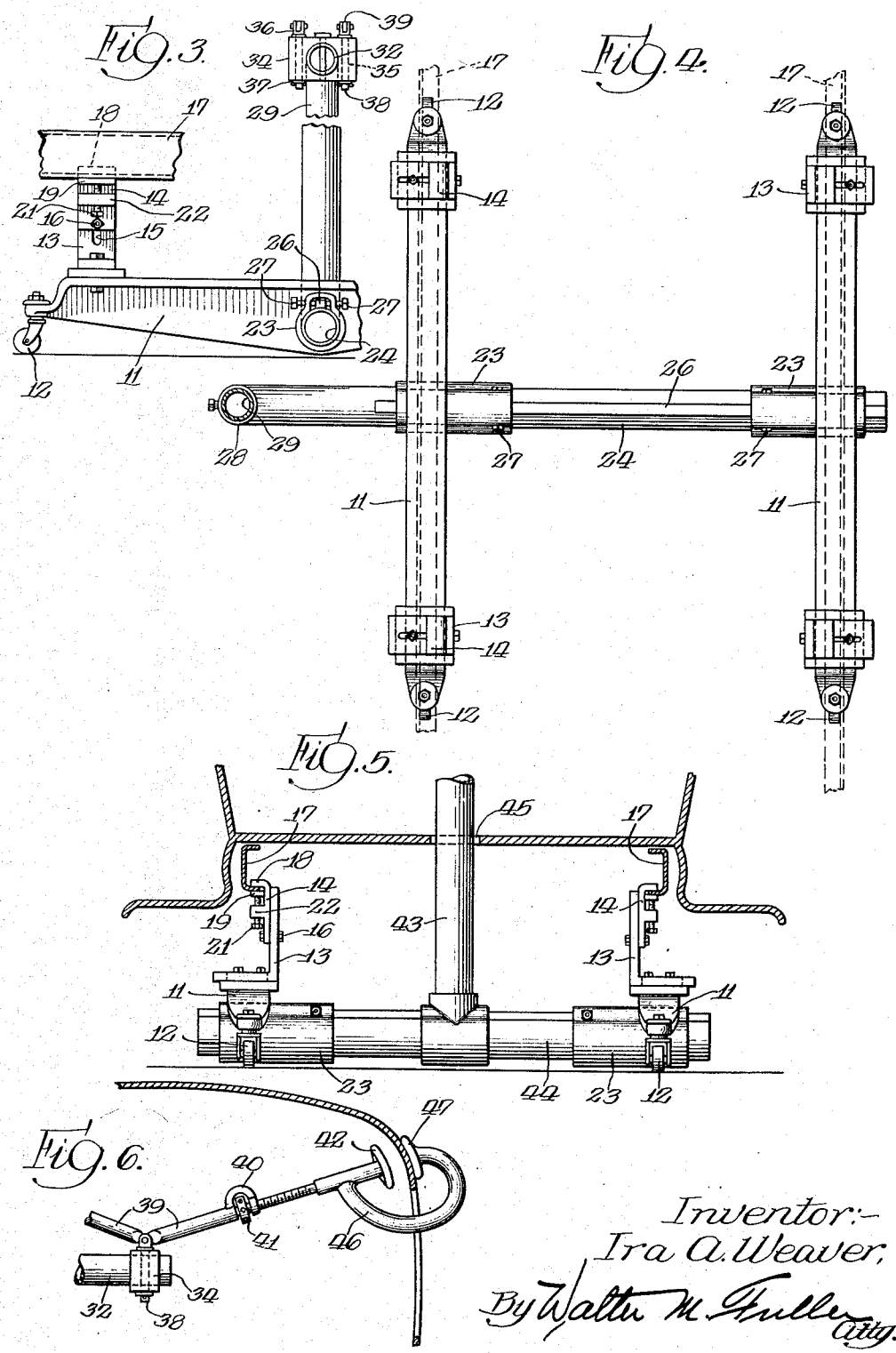

Patented Mar. 21, 1939

2,151,063

UNITED STATES PATENT OFFICE 2,151,063

AUTOMOBILE BODY REPAIRING APPLIANCE

Ira A. Weaver, Springfield, Ill., assignor to Weaver Manufacturing Company, Springfield, Ill., a corporation of Illinois Application August 30, 1937, Serial No. 161,604

2 Claims. (Cl. 153—32)

The current invention pertains to certain features of betterment and advantage in repairing automobile bodies after they have become damaged or injured, as in collisions, whereby to straighten out or remove the dents or irregularities in their contours due to their impact with other bodies.

Stated somewhat differently, the present invention concerns novel, efficient and simple means for repairing the bodies of automobiles or the like and it relates more particularly to satisfactory and easily manipulated means for removing dents or bends in the metal sheets of such bodies.

Manual hammering of the sheet-metal of such bodies is not only a laborious procedure, but the quality of such work is subject to substantial improvement.

Accordingly, it is a leading object or prime purpose of this invention to provide effective means to repair or recondition the damaged body to its original conformation, an additional aim of the invention being to supply an appliance of this character which can be made at relatively low cost.

To enable those skilled in this art to understand the invention both from structural and functional standpoints, present preferred embodiments thereof have been illustrated in the accompanying drawings, throughout the views of which like reference characters have been employed to designate the same parts.

In these drawings:

Figure 3 is a fragmentary detail view of a part of the appliance;

Figure 4 is a plan view of the base portion of the device;

Figure 1:
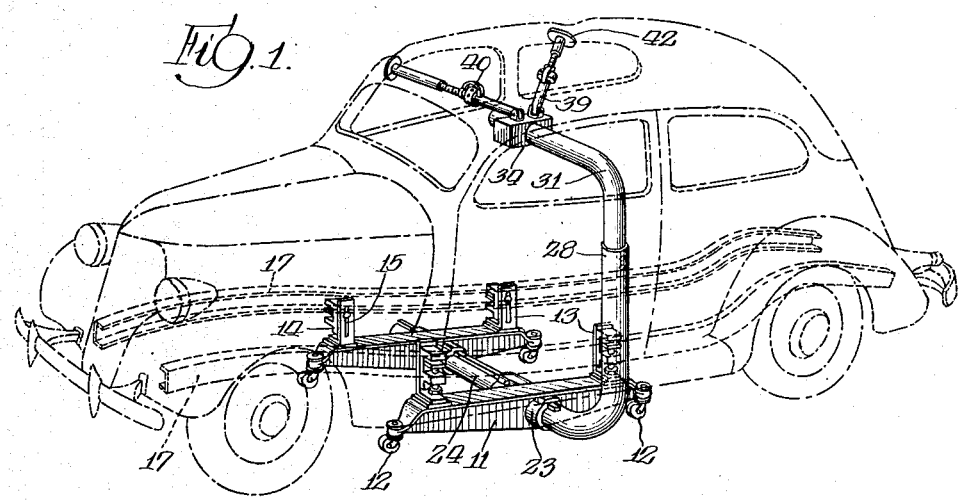
Figure 1 illustrates one embodiment of the invention in use on an automobile, the body of which requires reshaping.
Figure 2:
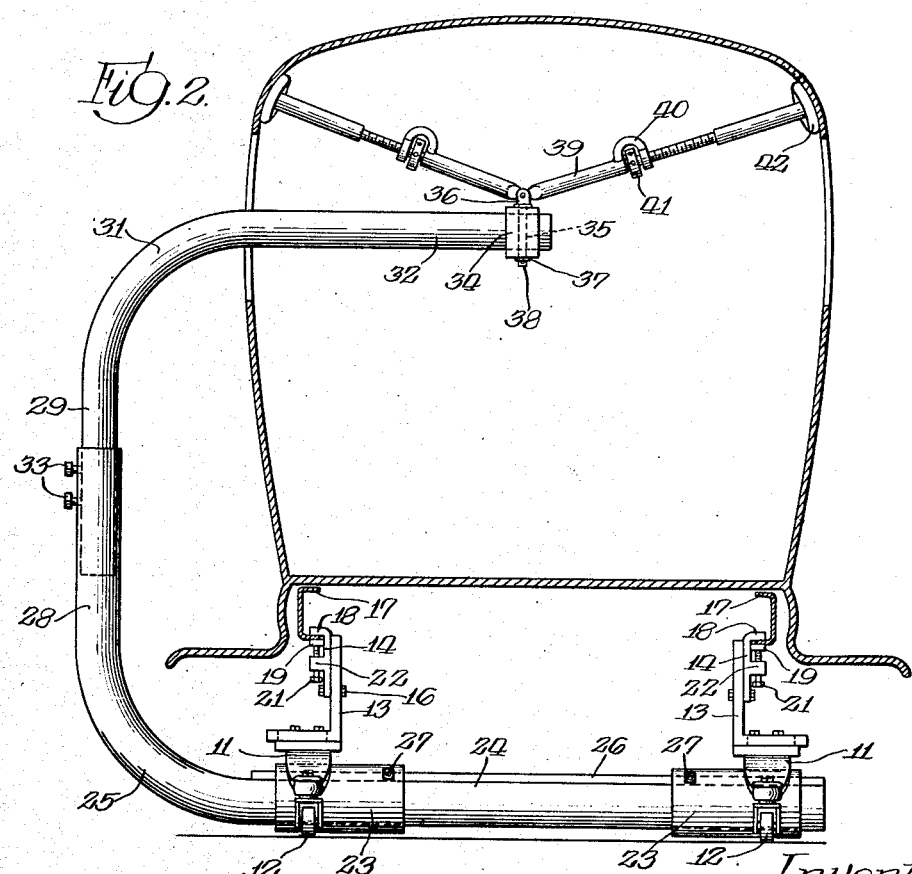
Figure 2 is a vertical cross-section through the automobile body showing the apparatus in operative position.

Figure 5 presents a modified construction; and

Figure 6 illustrates a different style of means for engaging the part of the injured body to be operated upon.

The novel repair apparatus includes a truck-base having two, longitudinal, parallel, spaced-apart side bars or frames 11, 11, each equipped at its opposite ends with caster-wheels 12, 12, whereby the appliance may be easily and readily rolled into position with relation to the automobile with which it is to be used.

On the top surface of each such side-bar is secured, adjustably if desired, as by slots and screws or bolts, two upstanding angle-brackets 13, 13, to the upper portion of the outer face of each of which a clamp 14 is vertically adjustably fastened by a slot 15 in the bracket and one or more bolts 16 occupying the slot.

Each such clamp is designed and adapted to be securely fastened to the lower, inwardly-extended flange of one of the side-sills 17 of the frame or chassis of the automobile, and, to this end, each clamp 14 has an outwardly projecting lip 18 at its top intended to overlie and bear on the side-sill flange and a block 19 adjustable by a screw 21 arranged to bear against the undersurface of the sill flange, such screw extending through a screw-threaded, vertical hole through a boss 22 on the member 14.

By these comparatively-simple means, the two side-bars of the truck can be easily, securely and fixedly fastened to the underframe of the automobile after the truck has been rolled into position for operation, the brackets, being removed, if necessary, for such introduction of the truck in position, after which they may be replaced thereon.

Each of such truck side-bars, at substantially its center, has a hole therethrough shaped in conformity with and accommodating a sleeve 23, whereby the two, aligned sleeves receive the horizontal lower portion 24 of a bent tube or pipe 25 having along its top a longitudinal rib 26 against the opposite sides of which bear the ends of opposed screws 27, 27 threaded through transverse holes in the sleeves by reason of which such lower part 24 is prevented from turning in the sleeves and the latter and their side-bars are adjustable along the length of the element 24 to adapt the appliance to automobile underframes of different widths.

The upturned or vertical part 28 of the tubular member 25 internally receives the lower end portion 29 of an upper, bent, tubular element 31, the top section 32 of which is desirably, but not necessarily, horizontal as shown; the part 29 being held in adjusted position as to height and angular relation in the part 28 by set-screws 33, 33 or by any other appropriate means, the two members 25 and 31 unitedly forming a suitable frame.

Part 32, near its free end, has a block or equivalent element 34 fixedly mounted thereon or adjustable thereon with capacity for fixation of operative position, such member 34 being apertured to receive the part 32, such block having one or more vertical holes through it, each affording a bearing for a short shaft 35 having at its top a bifurcated head 36 and supplied at its bottom with a washer 37 and a retaining cross-pin 38.

Each such head has hinged in it one end of a tube 39 having an arm 40 with an aperture therethrough in register with the passage through the tube, such arm being spaced away from the end of the tube to accommodate a nut 41 of a width or thickness approximately equal to such space, whereby the nut may be turned but it cannot shift longitudinally, such nut being threaded on the screw-threaded shank of a pressure foot or shoe 42, the outer surface of which is appropriately curved.

These cooperating elements are so made and related to one another in any suitable manner that, when the nut is turned in one direction, the presser foot or shoe will be positively forced outwardly, and, when the nut is turned in the opposite direction, the foot or shoe will be moved inwardly.

From what precedes, it will be clear that each such presser element 42 has a universal-joint connection with the main support 25—31, thus allowing either part 42 to be operative on practically any portion of the car-body, it being apparent that any other construction which will permit the accomplishment of the desired result may be used instead, if preferred.

Assuming that the roof portion of the automobile has been dented inwardly, as shown in Figure 1, the new appliance is introduced under the automobile with the parts 25 and 31 extended around the outside of the car and the several clamps are fastened securely to the automobile underframe, whereby the latter will resist the strains incident to reforming or reshaping the indentation in the roof.

With the arm 32 projecting into the interior of the car-body, either through an open doorway or an open window, the pressure-foot 42 of one of the forcing devices is applied to the inner side of one of the dents and forced outwardly by manipulation of its operating nut until the injured part of the sheet-metal roof or body is properly reconditioned and in its original smooth state and harmonizing with the remainder of the body or roof.

The same or the companion, screw-threaded reforming device may be employed in the same way to remove any other dents or depressions, and, in some instances, it may be desirable to apply the one pressure-foot against one part of the body or roof while the other pressure-foot is forcing out a dented part of the opposite portion of the body or roof to equalize more or less the strains and stresses involved.

In some cases, as shown in Figure 5, instead of having the compound bent arm 25—31 extend around the outside of the automobile body and then into the same through a doorway or window opening, a straight or bent, comparable arm 43 is secured to a tubular member 44, corresponding to the part 24, between the two side-bars of the truck and it extends upwardly into the car-body through an opening 45 in the car-floor, such arm, of course, at its upper straight or bent end (not shown) carrying one or more of such dent-removing elements.

To reshape any outwardly bulged deformation of the car body or roof, a slightly modified type of pressure-foot 46 may be used having an outer, suitably-curved, reforming foot or block 47 adapted to extend out through a window or door opening and to contact with the outer injured face of the body or roof, as presented in Figure 6.

Obviously, by turning the operating nut, this element can be forcibly drawn inwardly to reshape the deformed part of the metal-sheet constituting a portion of the body or roof.

The examples of structures herein presented are to be considered as merely illustrative of some ways in which the invention can be employed to advantage, but it is to be understood that these are not to be taken in a restrictive sense since many modifications and changes may be resorted to without departure from the heart and essence of the invention as defined by the appended claims, and without the loss or sacrifice of any of the substantial benefits and material advantages accruing from the use of the invention.

The following claims are intended to be construed as generically as the state of the prior art will permit.

I claim:

1. In an automobile-body repairing appliance, the combination of a member, means to clamp said member to the underframe of the automobile, a standard on said member shaped to extend around the outside of the automobile and into the automobile-body through one of its side openings while said member is clamped to said underframe, and pressure-means mounted on said standard design to engage the damaged part of the automobile-body and to reform the same to its original shape.

2. In an automobile-body repairing appliance, the combination of a caster-equipped truck designed to be introduced beneath the automobile, means on said truck adapted to be clamped to the underframe of the automobile, a standard on said truck shaped to extend around the outside of the automobile and into the automobile-body through one of its side openings, and pressure-means on said standard adapted to engage the damaged part of the automobile-body and to reform it to its original shape.

IRA A. WEAVER.